(12) United States Patent
Kashmadze et al.

(10) Patent No.: US 11,704,747 B1
(45) Date of Patent: Jul. 18, 2023

(54) DETERMINING BASE LIMIT VALUES FOR CONTACTS BASED ON INTER-NETWORK USER INTERACTIONS

(71) Applicant: Chime Financial, Inc., San Francisco, CA (US)

(72) Inventors: Shalva Kashmadze, San Francisco, CA (US); Elyse Lefebvre, San Francisco, CA (US); Dennis Jiang, San Francisco, CA (US); Akshat Khandelwal, San Francisco, CA (US); Aaron Plante, Delray Beach, FL (US); Rakesh Vemulapally, Foster City, CA (US); Shashank Gadda, Dublin, CA (US); Lynne Cai, San Francisco, CA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

(21) Appl. No.: 17/656,816

(22) Filed: Mar. 28, 2022

(51) Int. Cl.
*G06Q 50/00* (2012.01)
*G06F 3/04847* (2022.01)
*G06F 3/04842* (2022.01)
*G06Q 20/06* (2012.01)

(52) U.S. Cl.
CPC ......... *G06Q 50/01* (2013.01); *G06F 3/04842* (2013.01); *G06F 3/04847* (2013.01); *G06Q 20/0655* (2013.01)

(58) Field of Classification Search
None
See application file for complete search history.

(56) References Cited

U.S. PATENT DOCUMENTS

| | | | | |
|---|---|---|---|---|
| 2010/0161477 | A1* | 6/2010 | Galit | G06Q 40/123 705/38 |
| 2012/0158589 | A1* | 6/2012 | Katzin | G06Q 20/22 705/44 |
| 2013/0018777 | A1* | 1/2013 | Klein | G06Q 40/02 705/38 |
| 2014/0006127 | A1* | 1/2014 | DeCook | G06Q 30/0208 705/14.17 |
| 2014/0006297 | A1* | 1/2014 | Hogg | G06Q 50/01 705/319 |
| 2017/0083881 | A1* | 3/2017 | Sardela Bianchi | G06Q 50/01 |
| 2018/0082321 | A1* | 3/2018 | Boccardi | G06Q 20/384 |
| 2018/0349990 | A1* | 12/2018 | Diriye | G06Q 40/03 |
| 2020/0074546 | A1* | 3/2020 | Coulter | G06Q 20/108 |

OTHER PUBLICATIONS

Milne, Alistair K. L. and Parboteeah, Paul, The Business Models and Economics of Peer-to-Peer Lending (May 5, 2016). ECRI Research Report, 2016, No. 17, Available at SSRN: https://ssrn.com/abstract=2763682 (Year: 2016).*

* cited by examiner

Primary Examiner — Andrew B Whitaker
(74) Attorney, Agent, or Firm — Keller Preece PLLC

(57) ABSTRACT

The disclosure describes embodiments of systems, methods, and non-transitory computer readable storage media that increase a base limit value for a contact based on a user interaction with a graphical user interface. Generally, the disclosed system provides a graphical user interface for display to a user that includes base limit increase elements to increase base limit values for contacts of the user. Based on user selection of a base limit increase element, the disclosed system can provide an increased base limit value to an account associated with the contact.

20 Claims, 9 Drawing Sheets

DETERMINING BASE LIMIT VALUES FOR CONTACTS BASED ON INTER-NETWORK USER INTERACTIONS

BACKGROUND

Recent years have seen significant developments in systems that utilize web-based and mobile-based applications to manage user accounts and digital information for user accounts in real time. For example, conventional systems utilize a variety of computer-implemented algorithms to determine account-specific values or limits and communicate such information via the web-based and mobile-based applications. For example, conventional systems often require a variety of user interfaces and user interactions for client devices to transmit sufficient digital information to determine values or limits for accounts corresponding to the client devices. Although conventional systems utilize various computer-implemented algorithms to determine and manage digital account values and limits, conventional systems suffer from a number of technical deficiencies, particularly with regard to efficiency, security, and flexibility of implementing computing devices.

For example, conventional systems are often inefficient. In particular, in order to establish a digital account and determine or change corresponding values, conventional systems often require client devices to proceed through a variety of different graphical user interfaces. In particular, conventional systems require excessive user interfaces and user interactions to transmit sufficient digital information to generate a digital account and/or modify values. Thus, conventional systems utilize processes and user interfaces that are computationally inefficient.

Furthermore, conventional systems also struggle with controlling security in managing digital accounts and base limit values. Web-based account management systems often suffer from interactions with fraudulent or fake accounts. Additionally, conventional systems often face security risks when adjusting account values. To illustrate, even though conventional systems require significant digital information, this digital information is often fraudulent, exposing conventional systems to digital pirates, fake accounts, and digital manipulation.

Additionally, conventional systems often provide only limited network connectivity between devices. More specifically, conventional systems for managing digital accounts often provide limited flexibility with regard to interaction and connectivity with other client devices. Rather, conventional systems often require client devices to open several different software applications to interact with various contacts. To illustrate, for a user client device to interact with a client device of a contact regarding digital account information, conventional systems often require users to toggle between several user interfaces and applications (e.g., a first application that indicates digital account information and a second application for interacting between client devices).

SUMMARY

One or more embodiments provide and/or solve one or more problems in the art with systems, methods, and non-transitory computer readable storage media that utilize network interactions between client devices to dynamically increase base limit values. For example, in one or more embodiments the disclosed systems generate and provide a graphical user interface to a client device that includes elements reflecting a plurality of contacts and increased base limit value elements corresponding to the plurality of contacts. Based on user interaction at the graphical user interface, the disclosed systems can increase the base limit value for an account corresponding to the contact and also generate a user interface at a client device corresponding to a contact, where the user interface includes an indication of the increased base limit value and an additional base limit value element (e.g., for increasing the base limit value of the initial user). The disclosed systems can further modify base limit values based on user interactions with the additional base limit value element. Indeed, in one or more embodiments, the disclosed systems can present graphical user interfaces and base limit value elements for contacts with or without user accounts to assist in securely generating accounts for client device contacts. As described further below, by managing base limit values based on intuitive graphical user interfaces and network connectivity between client devices, the disclosed systems can improve efficiency, security, and flexibility of implementing computing devices.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1:
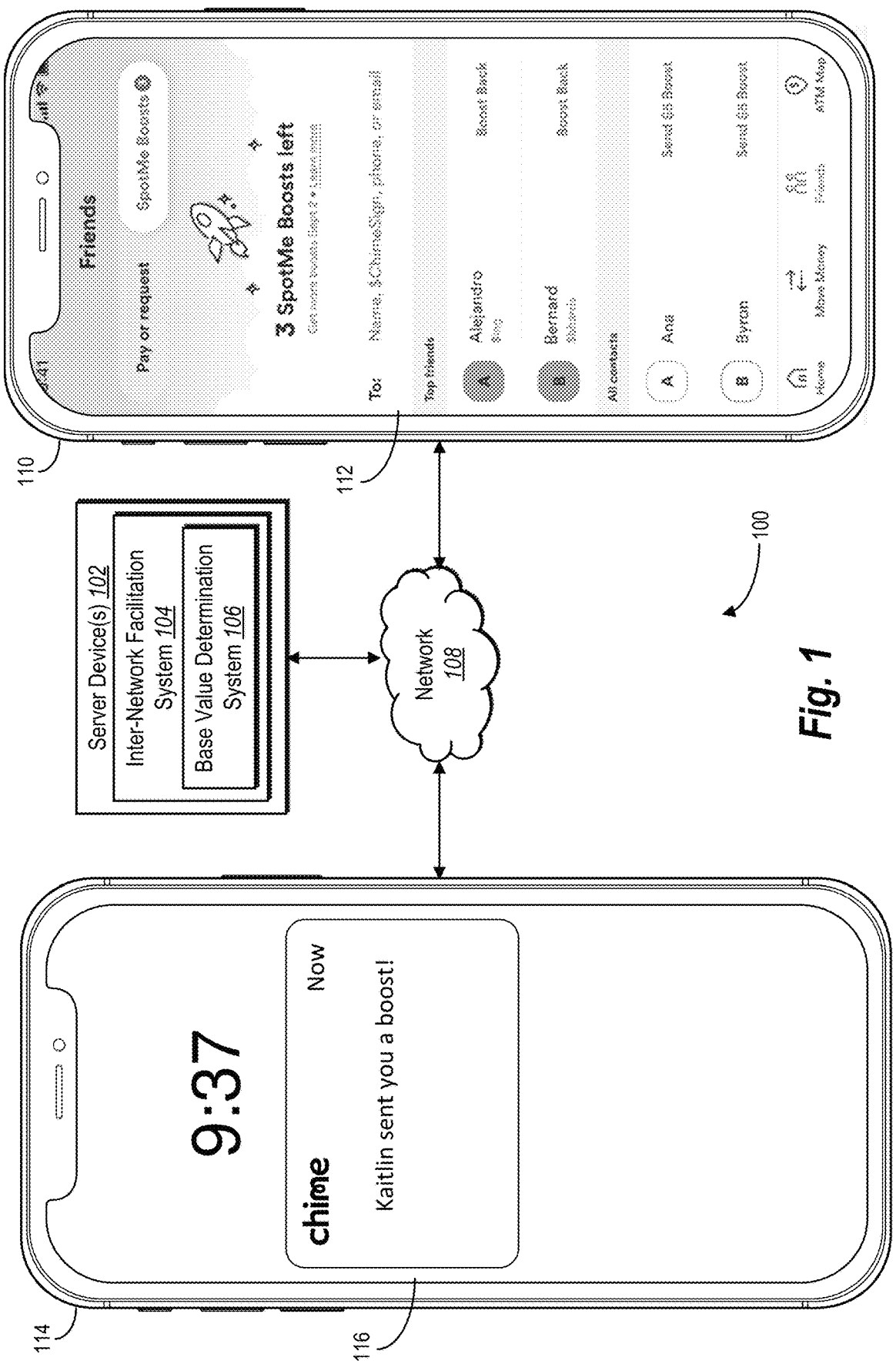
FIG. 1 illustrates a schematic diagram of an environment for implementing an inter-network facilitation system and a base value determination system in accordance with one or more implementations.

The present disclosure describes one or more embodiments of a base value determination system that utilizes unique graphical user interfaces and network connectivity between client devices to dynamically and intelligently modify base limit values.

As an example, the base value determination system provides, for display within a graphical user interface of a computing device corresponding to a user, a plurality of base limit increase elements corresponding to a plurality of contacts. The base value determination system can receive an indication of a selection of a base limit increase element of the plurality of base limit increase elements corresponding to a contact of the plurality of contacts. In some embodiments, in response to receiving the indication of the selection, the base value determination system provides an increased base limit value for an account associated with the contact.

As just mentioned, in one or more embodiments the base value determination system provides a plurality of base limit increase elements corresponding to a plurality of contacts within a graphical user interface. For example, the base value determination system identifies contacts from a client device, generates graphical user interface elements reflecting the contacts and also generates one or more base limit increase elements corresponding to the contacts. In one or more embodiments, the base value determination system intelligently arranges the digital contacts within the graphical user interface (e.g., based on contacts that have previously provided a base limit value increase or based on contacts that a user is most likely to transmit a base limit value increase).

In one or more embodiments, the base value determination system intelligently determines a number or limit of base limit value increases. For example, in one or more embodiments, the base value determination determines a threshold number of base limit value increases that a user can transmit within a threshold period of time. The base value determination system can indicate this information via the graphical user interface. Moreover, in some embodiments, the base value determination system determines a threshold number of base limit value increases that a user or contact may receive within a threshold time period. The base value determination system can identify these limits or thresholds based on a variety of signals corresponding to the user or contact.

As mentioned above, the base value determination system can operate with client devices regardless of account status. For example, in one or more embodiments, the base value determination system provides base value limit increase elements via a graphical user interface for internal/system contacts and external contacts. For example, external contacts include contacts not associated with an existing account in an inter-network facilitation system.

Based on user selection of a base limit increase element, the base value determination system provides an increased base limit value for an account associated with the contact. For example, the base value determination system can increase the base limit value for an existing account or otherwise create a new account if the contact is not associated with an existing account. Indeed, the base value determination system can increase efficiency and security for internal contacts and external contacts by modifying base limit values based on detected network connectivity and user interaction across client devices.

In one or more embodiments, the base value determination system associates the change to the base limit value with a threshold period of time. For example, in some embodiments, the base value determination system increases the base limit value for a threshold period, such as a month or a period of time remaining before the end of a month. In this manner, the bas value determination system iteratively modifies base limit values based on continued network interaction across client devices.

As mentioned, in one or more embodiments the base value determination system provides a variety of technical advantages relative to conventional systems. For example, in one or more embodiments the base value determination system improves efficiency relative to conventional systems. To illustrate, as mentioned above, in one or more embodiments the base value determination system dynamically modifies base limit values (and/or generates digital accounts with modified based limit values) based on network interaction across client devices. In contrast to conventional systems that require numerous graphical user interfaces and user interfaces from a client device to provide sufficient digital information to modify base limit values (and/or generate a digital account), the base value determination system can modify base limit values for multiple accounts from a single user interface of a client device. Accordingly, the base value determination system can reduce time and computing resources needed to dynamically modify individual base limit values.

Moreover, in one or more embodiments the base value determination system also improves security relative to conventional systems. In particular, the base value determination system utilizes user actions and network connectivity across client devices to identify contacts for increased base limit values. More specifically, the base value determination system identifies a web of network contacts across client devices and utilizes that network connectivity to determine increased base limit values. Indeed, the base value determination system increases base limit values upon selection by a client device of another contact associated with an authentic account. By leveraging network connectivity across contacts, the base value determination system reduces security risks associated with fraudulent accounts and is more likely to increase base limit values for client devices associated with authentic accounts. Furthermore, the base value determination system improves security by ensuring the authenticity of new accounts by enabling users to select external contacts not associated with existing accounts. Thus, the base value determination system can verify the authenticity of external contacts before creating new associated accounts and determine associated base limit values.

Furthermore, the base value determination system improves flexibility and network connectivity relative to conventional systems. As mentioned above, in one or more embodiments, the base value determination system allows client devices to send base limit value increases to contacts directly from a software application for managing digital accounts. Moreover, the base value determination system can generate notifications and communications both internal contacts (having accounts) and external contacts (without accounts). Accordingly, the base value determination system reduces the need for client devices to navigate away from a single application to interact with contacts, further improving flexibility, efficiency, and connectivity across client devices.

As illustrated by the foregoing discussion, the present disclosure utilizes a variety of terms to describe features and advantages of the disclosed method. Additional detail is now provided regarding the meaning of such terms.

As used herein, the term "base limit value" refers to a numerical value that represents an excess utilization buffer for a user account. In particular, the base limit value can include a numerical value that represents an amount that a user account is permitted to obtain or transact in excess of an amount belonging to the user account. As an example, a base limit value can include a monetary overdraft amount.

As used herein, the term "base limit increase element" refers to a graphical user interface element associated with increasing a base limit value. In particular, a base limit increase element includes a graphical user interface that, when interacted with, triggers an increase in a base limit increase for a corresponding contact. For example, a base limit increase element can comprise a selectable user interface element provided for display at a computing device.

As used herein, the term "contact" refers to an individual, user, or person associated with another user. A computing device may store communication data for a contact. For instance, a contact may include a person associated with a stored phone number, email address, physical address, or other communication data (e.g., stored on a contact database of a client device of a user). Additionally, a user may connect with a contact via a third-party system. For example, a user can communicate with a contact via a third-party messaging system including a social network, an inter-network facilitation system, and other third-party systems.

As mentioned above, a contact can include an internal/system contact or an external contacts. Generally, a system/internal contact includes a contact that has an existing account (e.g., with an inter-network facilitation system). For example, a system contact has a checking account with a given online banking organization. An external contact refers to a contact without an account (e.g., without an existing account with an intern-network facilitation system). For instance, the external contact does not have any sort of account with the given online banking organization, and the external contact is a phone contact of a user.

As used herein, the term "account" refers to a repository of assets or sensitive information corresponding to a user. In particular, an account includes a financial account into and out of which cash or digital assets can be transferred. For example, an account may refer to a bank account, debit card account, cash card, credit card account, online accounts, or gift card account. For example, in some embodiments, an account includes a checking account associated with a base limit value.

The following disclosure provides additional detail regarding the base value determination system in relation to illustrative figures portraying example embodiments and implementations of the base value determination system. For example, FIG. 1 illustrates a block diagram of a system environment (or "environment") 100 for implementing an inter-network facilitation system 104 and a base value determination system 106 in accordance with one or more embodiments. As shown in FIG. 1, the environment 100 includes server device(s) 102 connected to a computing device 110 and a contact computing device 114 via a network 108. While FIG. 1 shows an embodiment of the base value determination system 106, alternative embodiments and configurations are possible. Furthermore, although FIG. 1 illustrates the base value determination system 106 being implemented by a particular component and/or device within the environment 100, the base value determination system 106 can be implemented, in whole or in part, by other computing devices and/or components in the environment 100 (e.g., the computing device 110). Additional description regarding the illustrated computing devices (e.g., the server device(s) 102, the computing device 110, the contact computing device 114, and/or the network 108) is provided with respect to FIGS. 7-8 below.

As shown in FIG. 1, the server device(s) 102 can include the inter-network facilitation system 104. In some embodiments, the inter-network facilitation system 104 determines, stores, generates, and/or displays financial information corresponding to a user account (e.g., a banking application, a money transfer application). Furthermore, the inter-network facilitation system 104 can electronically communicate (or facilitate) financial transactions between one or more user accounts (and/or computing devices). In some embodiments, the inter-network facilitation system 104 also tracks and/or monitors financial transactions and/or financial transaction behaviors of a user within a user account.

Indeed, in some examples, the inter-network facilitation system 104 facilitates financial transactions and digital communications across different computing systems over one or more networks. For example, the inter-network facilitation system 104 manages credit accounts, secured accounts, and other accounts for a single account registered within the inter-network facilitation system 104. In some cases, the inter-network facilitation system 104 is a centralized network system that facilitates access to online banking accounts, credit accounts, and other accounts within a central network location. Indeed, the inter-network facilitation system 104 can link accounts from different network-based financial institutions to provide information regarding, and management tools for, the different accounts.

Furthermore, the base value determination system 106 can provide an increased base limit value for an account associated with a contact of a user based on user selections. Moreover, the base value determination system 106 can generate user interface elements within a display screen of the computing device 110 (in accordance with one or more embodiments). As illustrated in FIG. 1, the base value determination system 106 provides a plurality of base limit increase elements corresponding to a plurality of contacts for display within a graphical user interface of the computing device 110.

As also illustrated in FIG. 1, the environment 100 includes the computing device 110 and the contact computing device 114. For example, the computing device 110 and/or the contact computing device 114 may include, but are not limited to, a mobile device (e.g., smartphone, tablet) or other type of computing device, including those explained below with reference to FIG. 8. Additionally, the computing device 110 and the contact computing device 114 can include a computing device associated with (and/or operated by) user accounts for the inter-network facilitation system 104. In some embodiments, the contact computing device 114 is associated with (and/or operated by) an external contact without a user account for the inter-network facilitation system 104. Moreover, although FIG. 1 illustrates a single computing device 110 and a single contact computing device, the environment 100 can include various numbers of client devices that communicate and/or interact with the inter-network facilitation system 104 and/or the base value determination system 106.

Furthermore, as shown in FIG. 1, the computing device 110 includes a client application 112. The client application 112 can include instructions that (upon execution) cause the computing device 110 to perform various actions. For example, as shown in FIG. 1, a user associated with an account can interact with the client application 112 on the computing device 110 to access financial information, initiate a financial transaction, and/or select (or utilize) an increase base limit element within the client application 112. In some embodiments, the contact computing device 114 also includes a client application 116 similar to the client application 112.

The client application 116 and/or the client application 112 may be a web application or a native application (e.g., a mobile application, a desktop application, etc.) on the contact computing device 114 or the computing device 110, respectively. In one or more implementations, the client application 116 and/or the client application 112 interfaces with the inter-network facilitation system 104 to provide digital content including graphical user interfaces to the contact computing device 114 and the computing device 110. In one or more implementations, the client application 116 and/or the client application 112 comprise browsers that render graphical user interfaces on the display of the contact computing device 114 and the computing device 110.

In certain instances, the computing device 110 corresponds to one or more user accounts (e.g., user accounts stored at the server device(s) 102). For instance, a user of a computing device can establish a user account with login credentials and various information corresponding to the user. In addition, the user accounts can include a variety of information regarding financial information and/or financial transaction information for users (e.g., name, telephone number, address, bank account number, credit amount, debt amount, financial asset amount), payment information, transaction history information, and/or contacts for financial transactions. In some embodiments, a user account can be accessed via multiple devices (e.g., multiple client devices) when authorized and authenticated to access the user account within the multiple devices.

As illustrated in FIG. 1, the contact computing device 114 represents a computing device associated with a contact of the user. As mentioned, the contact associated with the contact computing device 114 may or may not be associated with a user account of the inter-network facilitation system 104. For example, the contact computing device 114 may be associated with an external contact that does not have an existing user account with the inter-network facilitation system 104.

The present disclosure utilizes computing devices (or user/client devices) to refer to devices associated with such user accounts. In referring to a computing (or user/client) device, the disclosure and the claims are not limited to communications with a specific device, but any device corresponding to a user account of a particular user. Accordingly, in using the term computing device, this disclosure can refer to any computing device corresponding to a user account of an inter-network facilitation system.

As further shown in FIG. 1, the environment 100 includes the network 108. As mentioned above, the network 108 can enable communication between components of the environment 100. In one or more embodiments, the network 108 may include a suitable network and may communicate using a various number of communication platforms and technologies suitable for transmitting data and/or communication signals, examples of which are described with reference to FIG. 8. Furthermore, although FIG. 1 illustrates the server device(s) 102, the computing device 110, and the contact computing device 114 communicating via the network 108, the various components of the environment 100 can communicate and/or interact via other methods (e.g., the server device(s) 102 and the computing device 110 can communicate directly).

As illustrated in FIG. 1, the base value determination system 106 provides a plurality of base limit increase elements (e.g., "Send $5 Boost" or "Boost Back" elements) corresponding to a plurality of contacts (e.g., "Ana" or "Alejandro") within a graphical user interface of the computing device 110 (e.g., The plurality of contacts include system contacts associated with user accounts of the inter-network facilitation system 104 and external contacts not associated with user accounts. The base value determination system 106 receives an indication of a user selection of a base limit increase element corresponding to a contact from the computing device 110. In response to receiving the indication of the selection, the base value determination system 106 provides an increased base limit value for an account associated with the contact. For instance, the base value determination system 106 increases the base limit value for an account corresponding to the contact associated with the contact computing device 114. The following figures and paragraphs further detail the base value determination system 106 providing increased base limit values in accordance with one or more embodiments.

Figure 4:
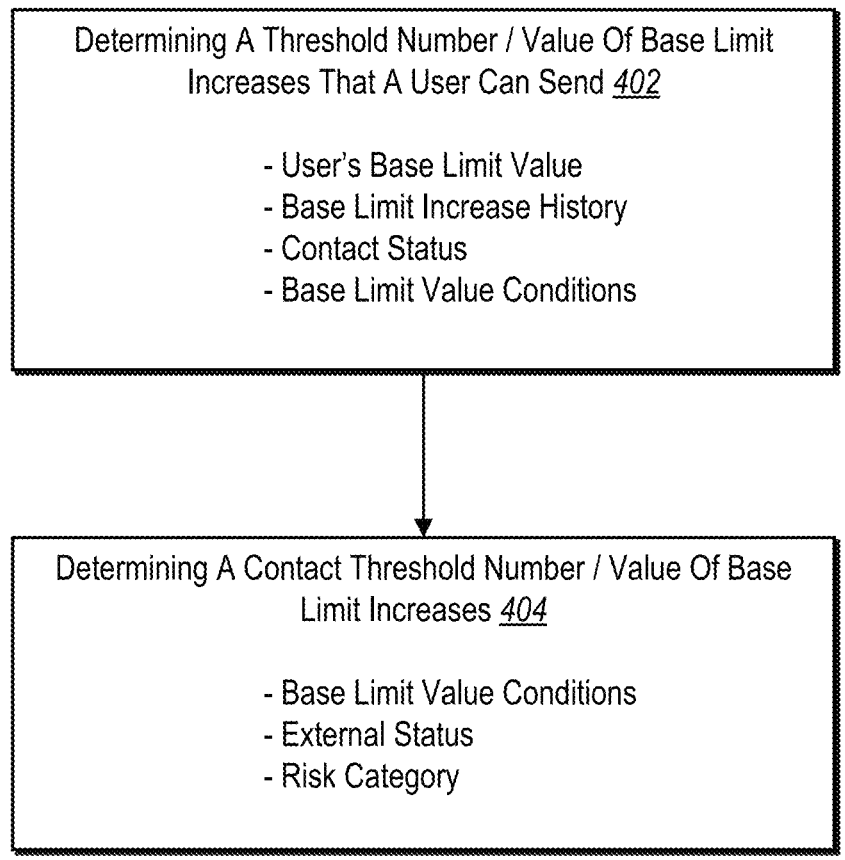
FIG. 4 illustrates a base value determination system determining a threshold number/value of base limit increases and a contact threshold number/value of base limit increases in accordance with one or more implementations.

As further illustrated in FIG. 1, the base value determination system 106 places various limitations on increasing the base limit value of contacts (e.g., "3 SpotMe Boosts Left"). For instance, the base value determination system 106 determines a threshold number or value of base limit increases that the user can send within a threshold period. The base value determination system 106 also determines a contact threshold number or value of base limit increases that a contact may receive within a threshold period. Generally, the threshold period comprises a period (e.g., one month, quarter, year, etc.) in which base limit increases are valid. To illustrate, at the expiration of the threshold period, base limit increases are removed from contact accounts, and the user may again send the threshold number of base limit increases. FIG. 4 and the corresponding paragraphs provide additional detail regarding the threshold number (or value) of base limit increases and the contact threshold number (or value) of base limit increases.

Furthermore, in some embodiments, the base value determination system 106 utilizes a variety of machine learning models and a base limit value model for transparently and efficiently presenting current and future base limit values for user accounts as described in U.S. patent application Ser. No. 17/519,129, entitled "Generating User Interfaces Comprising Dynamic Base Limit Value User Interface Elements Determined From a Base Limit Value Model," filed Nov. 4, 2021, and incorporated in its entirety by reference herein.

Figure 2:
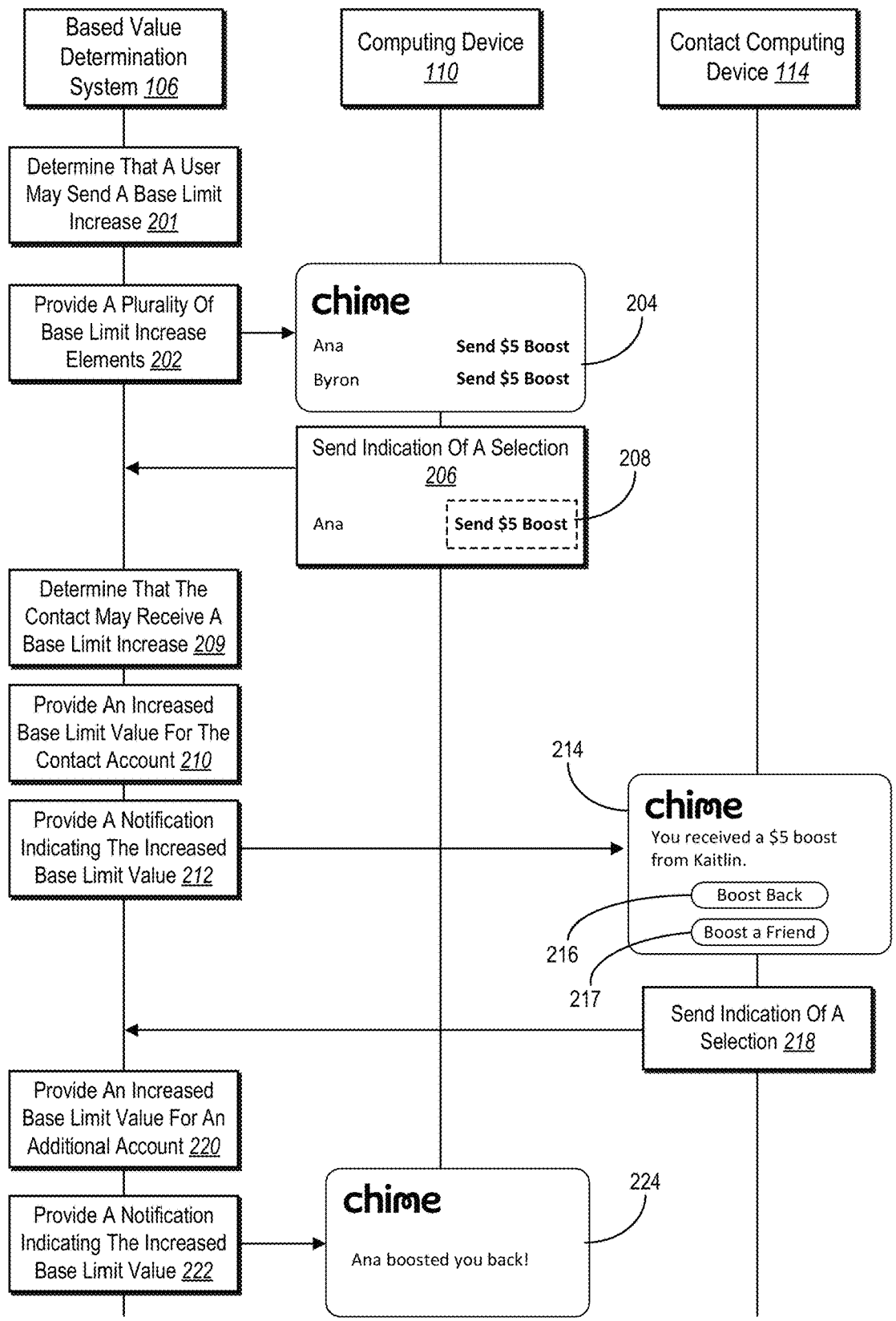
FIG. 2 illustrates an overview of the base value determination system providing increased base limit values for a contact and a user in accordance with one or more implementations.

FIG. 2 illustrates the base value determination system 106 providing graphical user interface elements as part of increasing base value limits for accounts based on user selections in accordance with one or more embodiments. More specifically, FIG. 2 illustrates example actions performed by the base value determination system 106, the computing device 110, and the contact computing device 114 as part of increasing base limit values based on user selections. FIG. 2 further illustrates various graphical user interfaces provided by the base value determination system 106 in accordance with one or more embodiments.

As illustrated in FIG. 2, the base value determination system 106 performs an act 201 of determining that the user may send a base limit increase. In some embodiments, the base value determination system 106 determines a threshold number of base limit increases that the user can send. The base value determination system 106 analyzes various metrics to determine the threshold number of base limit increases. For example, FIG. 4 and the corresponding discussion provide further detail regarding the base value determination system 106 determining and applying the threshold number of base limit increases. Based on determining that the user may send a base limit increase, the base value determination system 106 proceeds to the act 202.

As illustrated in FIG. 2, the base value determination system 106 performs an act 202 of providing a plurality of base limit increase elements for display within a graphical user interface of the computing device 110. The base value determination system 106 provides a plurality of base limit increase elements corresponding to a plurality of contacts. For example, the base value determination system 106 can provide to the computing device 110 a contact base limit increase graphical user interface 204.

The computing device 110 illustrated in FIG. 2 presents the contact base limit increase graphical user interface 204. Generally, the graphical user interface 204 lists a plurality of base limit increase elements corresponding to plurality of contacts. As mentioned, the plurality of contacts comprises contacts associated with the computing device 110. For example, and as illustrated in FIG. 2, the graphical user interface 204 includes contacts Ana and Byron and corresponding base limit increase elements for sending a $5 base limit increase to the contacts (e.g., "Send $5 Boost").

As further illustrated in FIG. 2, the computing device 110 performs an act 206 of sending an indication of a user selection. In particular, the computing device 110 detects a user selection of base limit increase element 208 associated with sending a $5 base limit increase to the contact Ana Mendieta. The computing device 110 further sends an indication of the selection to the server device(s) 102.

Based on receiving the indication of the selection, the base value determination system 106 performs an act 209 of determining that the contact may receive a base limit increase. In some embodiments, the base value determination system 106 determines a contact threshold number of base limit increases corresponding to the contact. The contact threshold number dictates the number of base limit increases that a contact may receive. For example, FIG. 4 and the corresponding paragraphs provide further detail regarding the base value determination system 106 determining and applying a contact threshold number of base limit increases in accordance with one or more embodiments. Based on determining that a number of base limit increases received by the contact is less than the contact threshold number of base limit increases, the base value determination system 106 proceeds to the act 210.

Figure 3:
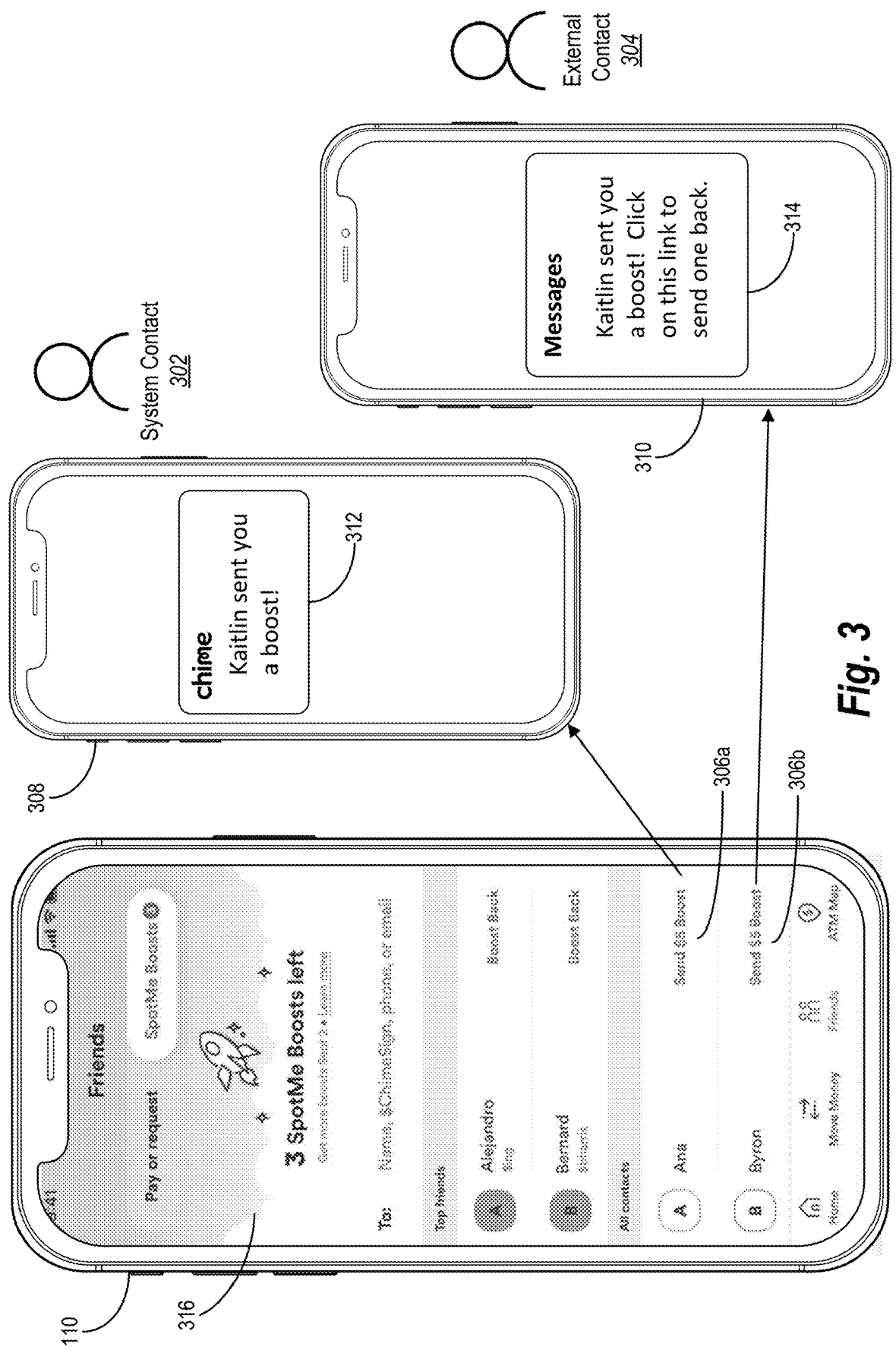
FIG. 3 illustrates a base value determination system increasing base limit values for a system contact and an external contact in accordance with one or more implementations.

As illustrated in FIG. 2, the base value determination system 106 performs an act 210 of providing an increased base limit value for the contact account. Generally, the base value determination system 106 provides an increase base limit value for an account for the account corresponding to the selected base limit increase element. For example, and as illustrated in FIG. 2, the base value determination system 106 provides a $5 base limit value increase for an account associated with the contact Ana. In some embodiments, the contact has an existing account with the inter-network facilitation system 104. In other embodiments, the contact is an external contact that does not have an existing account with the inter-network facilitation system 104. FIG. 3 and the corresponding paragraphs further detail how the base value determination system 106 provides increased base limit values for both system contacts and external contacts.

In some cases, the contact comprises an external contact not associated with an existing account. In some embodiments, the base value determination system 106 does not perform the act 210 and proceeds to the act 212. More specifically, and as described in greater detail below in relation to FIG. 3, the base value determination system 106 stores a record of the increased base limit value for the contact and provides an increased base limit value for the contact when the base value determination system 106 creates a contact account.

As further illustrated in FIG. 2, the base value determination system 106 performs an act 212 of providing a notification indicating the increased base limit value. Generally, based on receiving the indication of the selection, the base value determination system 106 provides, for display within an additional graphical user interface of the contact computing device 114, a notification 214 indicating the increased base limit value. In some embodiments, the notification 214 also includes an additional base limit increase element 216 corresponding to the user. As illustrated in FIG. 2, the notification 214 indicates, to the contact, that the contact's account has an increased base limit value. The notification 214 further indicates the identity of the user who originally selected base limit increase element corresponding to the contact (e.g., Kaitlin).

Additionally, in some embodiments, the notification 214 further comprises a third-party base limit increase element 217. Generally, based on an indication that the contact selected the third-party base limit increase element 217, the base value determination system 106 provides additional options for the contact to send base limit increases to the contact's connections. In some embodiments, based on user selection of the third-party base limit increase element 217, the base value determination system 106 provides a list of contact connections together with corresponding base limit increase elements for display via the contact computing device 114.

In some embodiments, based on selection of the additional base limit increase element 216, the base value determination system 106 increases the base limit value for the user. To illustrate, the contact computing device 114 performs an act 218 of sending an indication of a selection. In particular, the contact computing device 114 detects a selection of the additional base limit increase element 216 and sends an indication of the selection to the base value determination system 106.

As illustrated in FIG. 2, the base value determination system 106 receives an indication of a selection of the additional base limit increase element 216 that corresponds to the user. Based on the indication of the selection, the base value determination system 106 performs an act 220 of providing an increased base limit value for an additional account. In particular, the base value determination system 106 provides an increased base limit value for the account corresponding to the user. To illustrate, the base value determination system 106 increases the base limit value for the account associated with the user of the computing device 110.

In some embodiments, based on providing an increased limit value for an additional account (e.g., the account associated with the user), the base value determination system 106 performs an act 222 of providing a notification indicating the increased base limit value. More specifically, the base value determination system 106 provides, to the computing device 110 associated with the user, a notification 224 indicating/identifying the contact. In some embodiments, the notification 224 also includes the amount by which the base value determination system 106 increased the base limit value for the additional account. In some embodiments, the notification 224 further includes a secondary base limit increase element (e.g., a boost back to the contact). Based on detecting user interaction with the secondary base limit increase element, the base value determination system 106 provides a second increased base limit value for the contact account. In other embodiments, the notification 224 does not include the secondary base limit increase element.

The base value determination system 106 may increase a base limit value for both a system contact and an external contact. FIG. 3 and the corresponding paragraphs describe the base value determination system 106 providing base limit values for both system contacts with accounts and external contacts without accounts in accordance with one or more embodiments. In particular, FIG. 3 illustrates the base value determination system 106 increasing a base limit value for an account associated with a system contact 302 and an account associated with an external contact 304.

FIG. 3 illustrates a contact base limit increase graphical user interface 316 presented via a display screen of the computing device 110. The contact base limit increase graphical user interface 316 includes a system contact, Ana, with a corresponding base limit increase element 306a. The contact base limit increase graphical user interface 316 also includes an external contact, Byron, with a corresponding base limit increase element 306b. In some embodiments, the base value determination system 106 provides an indication of whether a contact is a system contact or an external contact. In one example, graphical user interface 316 includes a "top friends" section listing only system contacts and a "contacts" section listing only external contacts.

In one or more embodiments, the base value determination system 106 intelligently arranges, clusters, or orders contacts in providing contacts for display. For example, the base value determination system 106 can predict which contacts a user is most likely to select for an increased base value limit (e.g., based on historical base limit value increases or other user features). The base value determination system 106 can order the contacts based on such a prediction (e.g., most likely contacts first). The base value determination system 106 can also arrange contacts based on location, number of connections, or whether the contacts have provided a base limit value increase to the user.

Based on receiving an indication of user selection of the base limit increase element 306a corresponding to the system contact, the base value determination system 106 increases the base limit value for an account associated with the system contact 302. In some embodiments, because the system contact 302 has an existing account, the base value determination system 106 increases the base limit value for the existing account by an increase amount (e.g., $5). As illustrated in FIG. 3, the base value determination system 106 sends a system notification 312 for display via a computing device 308 associated with the system contact 302. In some embodiments, the system notification 312 is sent using a messaging system of the inter-network facilitation system 104. For instance, the system notification 312 comprises an indication of the increased base limit value within a messaging functionality of the online banking app, Chime. Additionally, or alternatively, the base value determination system 106 sends a notification via text message, email, or another third-party messaging method.

Based on receiving an indication of user selection of the base limit increase element 306b corresponding to the external contact, the base value determination system 106 increases the base limit value for an account associated with the external contact 304. Because the external contact 304 does not have an account with the inter-network facilitation system 104, the base value determination system 106 sends a notification 314 to a computing device 310 associated with the external contact 304 using a third-party messaging method. For instance, and as illustrated, the base value determination system 106 sends a text message to the computing device 310 indicating the increase base limit value.

In some embodiments, the base value determination system 106 transmits a digital notification regarding the base limit increase to the computing device 310 via email, social media messaging, or other type of messaging. More specifically, the base value determination system 106 transmits the digital notification based on how the computing device 110 accesses communication information for the computing device 310. For instance, if the computing device 110 accesses a social network profile associated with the computing device 310, the base value determination system 106 can transmit a digital notification to the computing device 310 via the social network profile. In another example, if the computing device 110 stores a phone number corresponding to the computing device 310, the base value determination system 106 may send a text message or a voice message to the computing device 310 using the stored phone number.

In some embodiments, the notification 314 includes a URL that redirects the external contact 304 to a landing page. In some embodiments, the URL comprises a referral URL with an existing parameter indicating an appropriate landing page to be shown. For example, the landing page can indicate the identity of the user, the amount of the base limit value increase, and options to create an account within the inter-network facilitation system 104.

Because the external contact 304 does not have an existing account with the inter-network facilitation system 104, the base value determination system 106 creates an account for the external contact 304. In some embodiments, instead of creating a new account for the external contact 304, the base value determination system 106 records the base limit value increase for the external contact 304. The following paragraphs describe the base value determination system 106 cataloguing base limit value increases for external contacts in accordance with one or more embodiments.

In some embodiments, the base value determination system 106 stores a universally unique identifier (UUID) token linked to an increase identification (ID). Based on receiving an indication of a selection of the element 306b, the base value determination system 106 generates an increase ID and a UUID. The increase ID indicates data relevant to the base limit value increase. For instance, the increase ID indicates the user, amount, and the external contact. The base value determination system 106 stores the increase ID keyed under the UUID. The computing device 110 logs that the computing device 110 sent a base limit value increase to the external contact 304, which prevents the computing device 110 from sending a second base limit value increase for the external contact 304. The base value determination system 106 sends a digital notification to the computing device 310 associated with the external contact 304 together with a UUID token. Based on enrollment (i.e., when the base value determination system 106 creates an account associated with the external contact 304), the base value determination system 106 looks up the increase ID to claim it for the new user based on the UUID token. The method of storing the UUID token and the identification ID provides benefits of being simple, lightweight, and requiring minimal server-side storage. Furthermore, this method requires the computing device 110 associated with the user to record and store which contacts have been selected for base limit value increases.

In another example, the base value determination system 106 stores contacts that have been selected for base limit value increases in addition to the UUID token and increase ID. In contrast to the method described above where the computing device 110 associated with the user keeps track of contacts that have been selected for base limit value increases, the base value determination system 106 stores the selected contacts at a centralized server. In particular, the base value determination system 106 performs the same acts above with respect to storing the increase ID keyed under the UUID. Additionally, the base value determination system 106 stores a hash including a user identification and contact information for the external contact 304. For instance, the hash may include a user identification and a normalized phone number for the computing device 310 associated with the external contact 304. The base value determination system 106 may analyze the hash to determine whether an external contact 304 has been previously selected for a base limit value increase. Based on determining that the external contact 304 has been selected, the base value determination system 106 may remove future options to select the external contact 304. This method requires less client-side logic and ensures consistent data and behavior across devices. For instance, the base value determination system 106 can prevent other users from selecting the same contact for base limit increases.

Another method by which the base value determination system 106 stores data for selected external contacts includes storing a hashed token linked to an increase ID. To illustrate, instead of generating a UUID that the base value determination system 106 cannot recreate, the base value determination system 106 generates a hashed token and uses the hashed token to indicate whether a contact has been selected for an increased base limit value. In some embodiments, the hashed token includes information such as the user's ID, contact information for the external contact 304, and a secret key. For instance, a hashed token may be represented by (user_id, normalized_phone_number, secret/salt). Using this method, the base value determination system 106 may look up an increase ID, query whether a contact has been previously selected for a base limit value increase, and also prevent attackers from guessing or generating UUID tokens. This method further provides the benefit of being simple and lightweight in addition to additional security.

In some embodiments, the base value determination system 106 makes additional distinctions between contacts beyond system contact and external contacts. To illustrate, in some embodiments, the base value determination system 106 determines a subset of close contacts. The base value determination system 106 may determine the subset of close contacts based on user input. For example, the base value determination system 106 may present user interface elements to the user to select contacts within the subset of close contacts. In one or more embodiments, the base value determination system 106 analyzes the user, contacts, user activity, and contact activities to determine the subset of close contacts. For example, the base value determination system 106 may analyze the frequency with which contacts send base limit value increases to the user and vice versa, the frequency of interaction (e.g., messaging, interacting with posts, etc.), and other activities to determine the subset of close contacts.

In some embodiments, the base value determination system 106 applies added functionalities to contacts within the subset of close contacts. In one example, the base value determination system 106 provides an option to increase the contacts base limit value by a greater second value base limit increase. For example, if a base limit increase equals $5, the second value base limit increase may be $7, $10, etc.

Additionally, the base value determination system 106 may increase the contact threshold number or value of base limit increases that a close contact may receive within a threshold period. In another example, the base value determination system 106 automatically increases the base limit value for contacts within the subset of close contacts. For instance, the base value determination system 106 may automatically send a base limit value increase from the user to a close contact for each threshold period. Furthermore, in some embodiments, the base value determination system 106 provides, for display at the computing device 110 associated with the user, information relating to close contacts. For instance, the base value determination system 106 may provide a feed of transactions comprising transactions conducted by close contacts. The base value determination system 106 may further allow users additional interaction options for close contacts. To illustrate, the base value determination system 106 may provide user interface elements for a user to like or comment on transactions conducted by close contacts.

In one example, the base value determination system 106 provides, for display within a graphical user interface of a computing device of a user, a group base limit increase element. Based on an indication that the user selected the group base limit increase element, the base value determination system 106 sends notifications of the base limit increase to contacts within the group (e.g., send a boost to immediate family members or a small group of friends). In some embodiments, the group comprises close contacts. Furthermore, the base value determination system 106 may provide increased base limit values for accounts associated with contacts within the group. In some implementations, the base value determination system 106 ranks contacts within a group in case the user does not have enough base limit increases to send to all contacts within the group. For instance, the threshold number of base limit increases that the user can send may be lower than the number of contacts within a group. In such cases, the base value determination system 106 sends base limit increases to contacts based on rank. In other embodiments, the base value determination system 106 limits the number of contacts that may be added to a group based on the threshold number of base limit increases. For instance, the base value determination system 106 does not allow a user to select more than four contacts for a group when the threshold number of base limit increases is four.

Furthermore, and as previously mentioned, the base value determination system 106 may increase the security of the inter-network facilitation system 104 utilizing the close contact designation. Generally, because a user is limited to a threshold number of base limit increases, the user likely sends base limit increases to authentic contacts. Contacts that are also connected to other users are associated with a higher probability of authenticity. Similarly, the base value determination system 106 may determine that contacts designated as close contacts are associated with a higher probability of authenticity.

Additionally, or alternatively, the base value determination system 106 constructs a graph based on interactions between users. The graph includes nodes representing users as well as edges that define or represent connections between nodes. Connections may comprise different interaction events. To illustrate, an interaction event between users can comprise a first user sending a base limit increase to a second user. Additionally, or alternatively, an interaction event may comprise another type of exchange such as the first user liking a transaction of the second user.

Furthermore, in some embodiments, the base value determination system 106 determines an edge strength between users. Generally, the edge strength reflects the number, frequency, and/or value of interaction events. For instance, to determine the edge strength, the base value determination system 106 may analyze the number, frequency, and value of base limit increases sent from and received by one user to another. More specifically, for a given connection between two users, the base value determination system 106 may record a total number of base limit increases sent between the users, a number of base limit increases sent by the first user to the second user, and a number of base limit increases sent by the second user to the first user.

In some implementations, the base value determination system 106 performs various actions based on the graph. In one example, the base value determination system 106 performs an action based on an edge satisfying a threshold edge strength. To illustrate, the base value determination system 106 determines a threshold edge strength. For instance, the threshold edge strength may equal fifty base limit increases sent between users. Based on determining that an edge strength between a first user and a second user satisfies the threshold edge strength, the base value determination system 106 sends a notification to one or both of the first user and the second user. For example, the notification may indicate that the first user and second user have sent a total of fifty base limit increases to each other. Additional notifications may indicate to a user that the user has received a threshold number of base limit increases from a particular contact or that the user has sent a threshold number of base limit increases to the particular contact.

Additionally, in some embodiments, the base value determination system 106 performs an action based on a user meeting a threshold edge number. For example, a threshold edge number may comprise ten base limit increases sent by a user. Based on determining that the user meets the threshold edge number, the base value determination system 106 may raise the threshold number of base limit increases that the user can send. Additionally, or alternatively, the base value determination system 106 provides additional account benefits based on the user meeting a threshold edge number. For example, the base value determination system 106 may increase the base limit value of the user based on the user sending more than fifty base limit increases to fifty different contacts. In another example, the base value determination system 106 determines a lower risk score and categorization for a user that has received a threshold number of base limit increases from different users.

Figure 8:
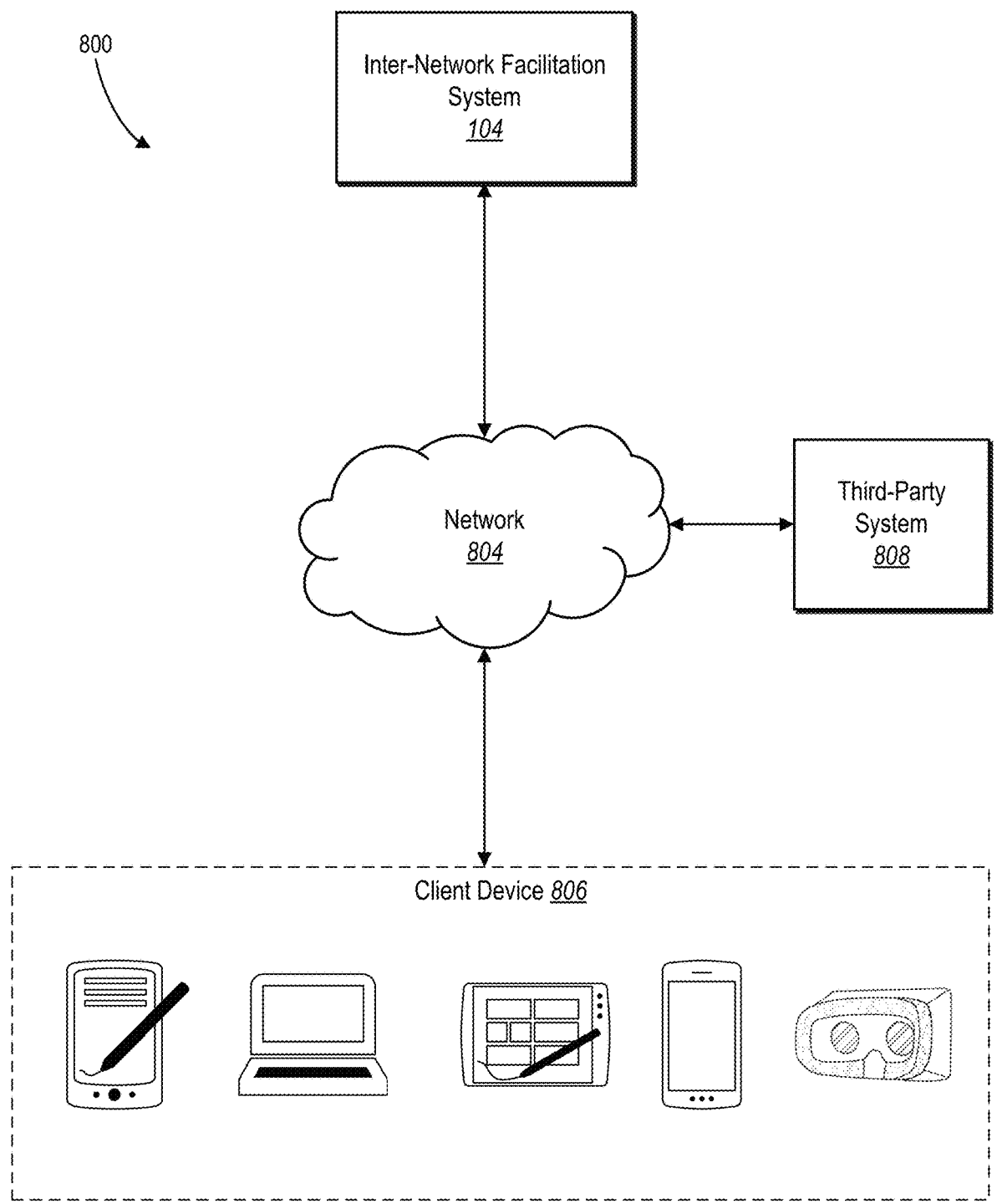
FIG. 8 illustrates an example environment for an inter-network facilitation system in accordance with one or more implementations.

In some embodiments, the base value determination system 106 utilizes the graph and/or edge strengths to perform a variety of downstream functions (e.g., corresponding to the inter-network facilitation system 104, as described in FIG. 1 and FIG. 8). Indeed, the base value determination system 106 can process the graph and/or edge strengths to determine a measure of connectivity between users and utilize this measure of connectivity to make a variety of decisions or determinations.

As mentioned, the base value determination system 106 determines limitations including a threshold number or value of base limit increases that a user can send and a contact threshold number or value of base limit increases. FIG. 4 and the corresponding paragraphs describe the base value determination system 106 analyzing various factors to determine the threshold number of base limit increases and a contact threshold number of base limit increases in accordance with one or more embodiments. In particular, FIG. 4 illustrates the base value determination system 106 performing an act 402 of determining a threshold number/value of base limit increases that a user can send and an act 404 of determining a contact threshold number/value of base limit increases. The threshold number/value of base limit increases reflects the number/value of base limit increases that the user can send within the threshold period. The contact threshold number/value of base limit increases reflects the number/value of base limit increases that a contact can receive within the threshold period.

As illustrated in FIG. 4, the base value determination system 106 performs the act 402 of determining a threshold number/value of base limit increases that a user can send. Generally, the base value determination system 106 determines a number of base limit increases that a user has sent. If the number of base limit increases that a user has sent meets the threshold number/value of base limit increases, the base value determination system 106 restricts the user from sending more. For example, the base value determination system 106 may remove base limit increase elements from a graphical user interface. Additionally, or alternatively, the base value determination system 106 provides a remaining number of base limit increases that a user may send to contacts.

In some embodiments, base limit increases that the user can send are a fixed value (e.g., $5). In these embodiments, the base value determination system 106 determines a threshold number of base limit increases that the user can send. In some embodiments, the base value determination system 106 determines that the user can send base limit increases of different values. For instance, users may send second value base limit increases of greater value (e.g., $10) to close contacts compared to base limit increases (e.g., $5) to other contacts. In these examples, the base value determination system 106 determines a threshold value of base limit increases that a user can send.

In some embodiments, the base value determination system 106 predetermines the threshold number/value of base limit increases that a user can send. For example, the base value determination system 106 might determine that all users may send four base limit increases of a $5 value for each threshold period (e.g., one month).

The base value determination system 106 analyzes various factors to determine the threshold number/value of base limit increases that a user can send. In some embodiments, the base value determination system 106 analyzes the users base limit value to determine the threshold number or value of base limit increases. For instance, the base value determination system 106 may analyze the user's account activity to determine the user's base limit value. The base value determination system 106 may assign a higher threshold number/value of base limit increases for a user with a greater base limit value.

As part of performing the act 402, the base value determination system 106 analyzes a user's base limit increase history. For example, the base value determination system 106 tracks engagement rate, number of base limit increases sent on average, number of base limit increases sent by the median person, and other data. The base value determination system 106 compares the user's base limit increase history with the data. In some embodiments, based on determining that the user sends more base limit increases than the median user or the average rate, the base value determination system 106 increases the threshold number/value of base limit increases that the user can send. In one embodiment, the base value determination system 106 increases the threshold number/value of base limit increases that a user can send based on determining that the user has sent the threshold number/value of base limit increases in the past. For example, based on determining that a user has sent the threshold number/value of base limit increases for a threshold number of previous threshold periods, the base value determination system 106 increases the threshold number/value of base limit increases by one unit (e.g., one more base limit increase or $5).

As further illustrated, and as previously mentioned the base value determination system 106 may determine the threshold number/value of base limit increases based on contact status. More specifically, the base value determination system 106 determines whether a contact is a close contact or a standard contact. The base value determination system 106 provides a greater threshold number/value of base limit increases that a user can send to close contacts than for standard contacts.

Furthermore, as part of performing the act 402, the base value determination system 106 may consider base limit value conditions. Generally, base limit value conditions refer to conditions associated with a user account. For example, base limit value conditions may include whether a user is signed up for direct deposit, whether a user account has a threshold value of deposited cash (e.g., $5,000), and other conditions. In some embodiments, the base value determination system 106 determines a lower threshold number/value of base limit increases for users associated with accounts that do not satisfy various conditions. In one example, the base value determination system 106 determines a threshold number of four base limit increases for accounts signed up for direct deposit and a threshold number of one base limit increase for accounts not signed up for direct deposit.

As further illustrated in FIG. 4, the base value determination system 106 also performs the act 404 of determining a contact threshold number/value of base limit increases. As mentioned, the base value determination system 106 may determine a contact threshold number (e.g., four base limit increases) or value (e.g., $20) of base limit increases that a contact may receive. In particular, the base value determination system 106 increases the base limit value of a contact based on determining that a number of base limit increases received by the contact is less than the contact threshold number of base limit increases. In some embodiments, the base value determination system 106 predetermines the contact threshold number/value of base limit increases. For example, the base value determination system 106 predetermines that no contact may receive more than $200 in value of base limit increases.

The base value determination system 106 may analyze base limit value conditions associated with the contact to determine the contact threshold number/value of base limit increases. Generally, the base value determination system 106 determines a lower contact threshold number/value for accounts that do not satisfy various conditions. To illustrate, the base value determination system 106 may allow contacts with direct deposit to receive four base limit increases while contacts without direct deposit may only receive one base limit increase. Similarly, the base value determination system 106 may determine the contact threshold number/value of base limit increases based on external status. More specifically, the base value determination system 106 determines a higher contact threshold number/value for system contacts than for external contacts. For instance, external contacts may only be able to receive one base limit increase.

Furthermore, in some embodiments, as part of performing the act 404, the base value determination system 106 analyzes risk categories to which a contact belongs. Generally, the base value determination system 106 may determine risk scores for user accounts based on various user account activity data. The base value determination system 106 assigns the contact accounts to various risk categories based on the risk scores satisfying different risk thresholds. The base value determination system 106 associates contact accounts having higher risk categorizations with lower contact threshold numbers/values.

Figure 5B:
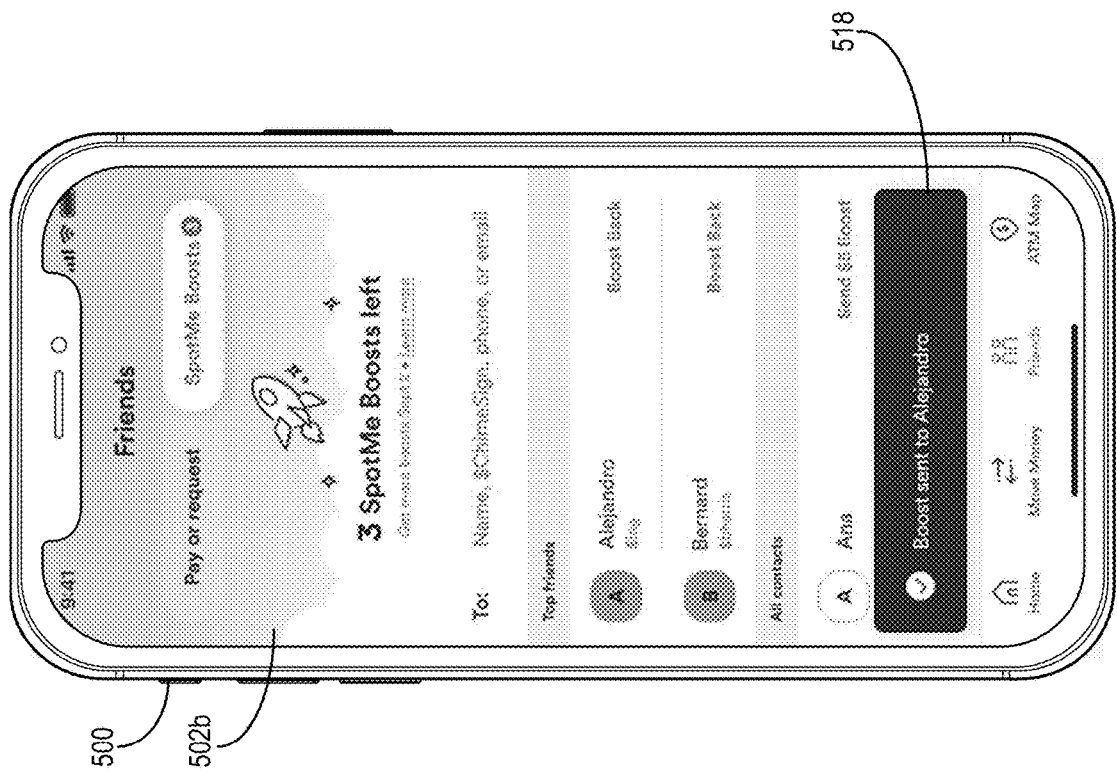
FIGS. 5A-5C illustrate example graphical user interfaces including base limit increase elements in accordance with one or more implementations.
Figure 5A:
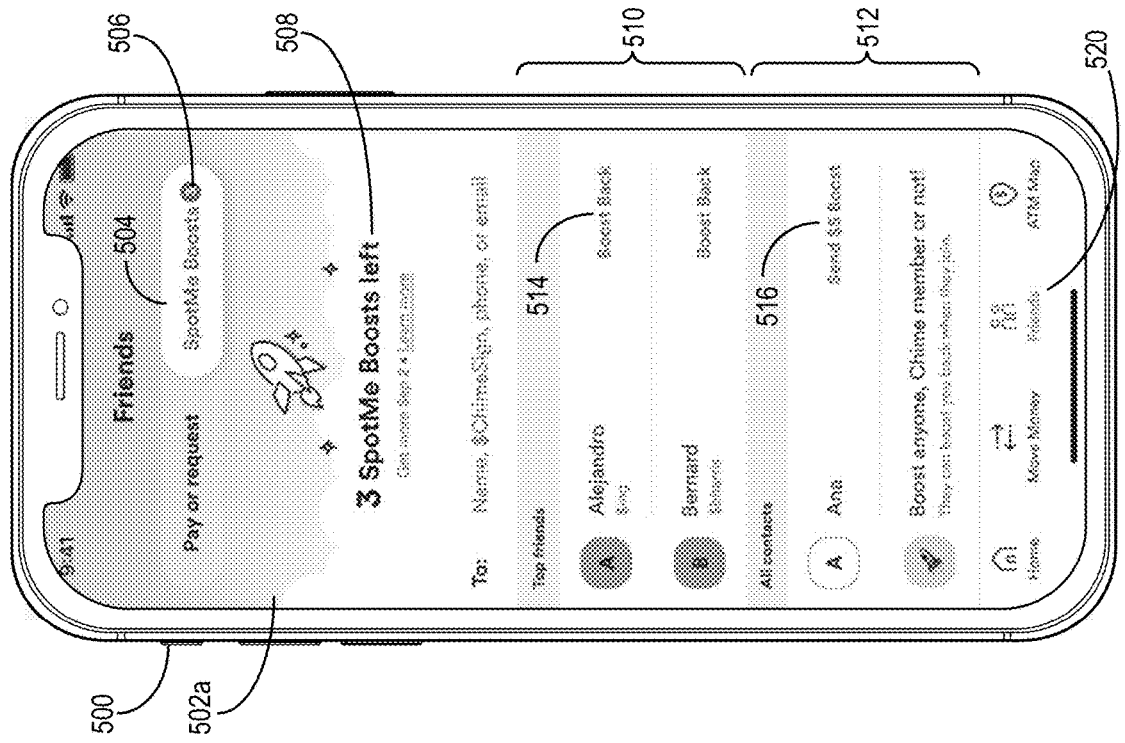
Figure 5C:
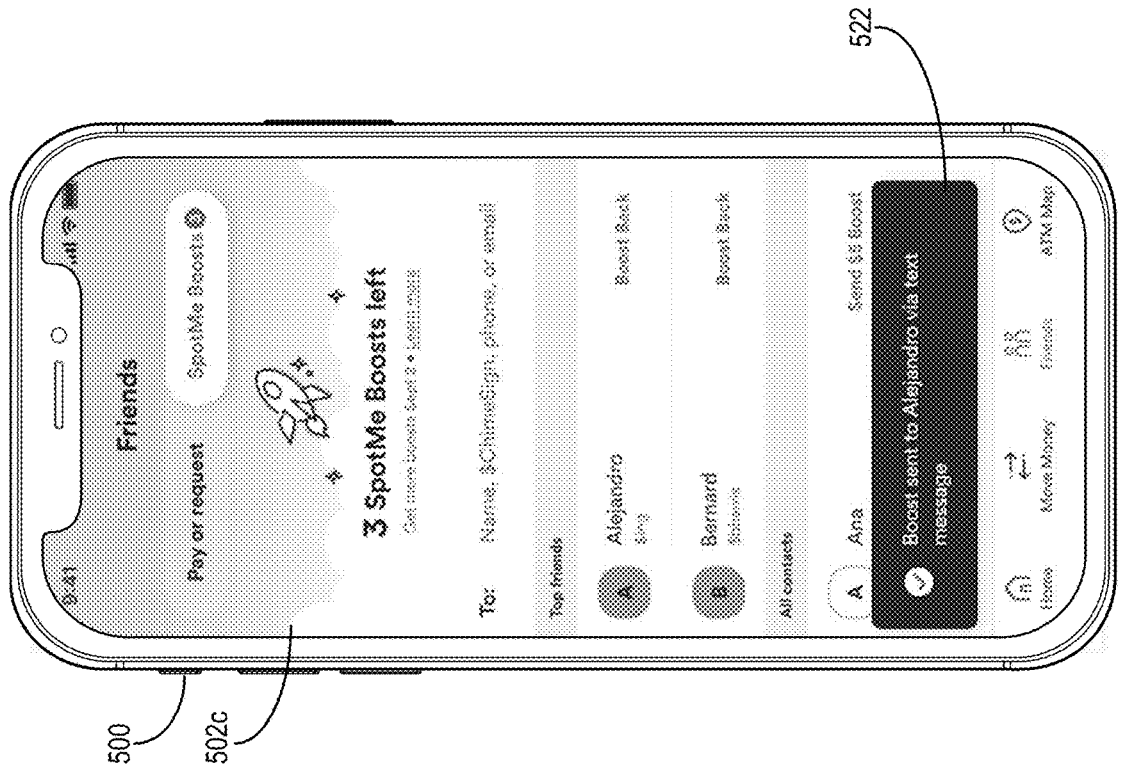

As mentioned, the base value determination system 106 provides a plurality of base limit increase elements corresponding to a plurality of contacts for display within a graphical user interface. FIGS. 5A-5C illustrate example graphical user interfaces in accordance with one or more embodiments. In particular, FIGS. 5A-5C illustrate contact base limit increase graphical user interfaces 502a-502c presented on screens of the computing devices 500.

As illustrated in FIG. 5A, the base value determination system 106 provides the contact base limit increase graphical user interface 502a. The contact base limit increase graphical user interface 502a includes a remaining base limit increase elements 508. The remaining base limit increase elements 508 indicates the remaining number of base limit increases that the user may send within the threshold period. As illustrated, the user associated with the computing device 500 may send three more base limit increases to contacts. In some embodiments, the contact base limit increase graphical user interface 502a further includes a threshold number of base limit increases element. The threshold number of base limit increases element reflects the total number of base limit increases that the user may send within the threshold period.

In some embodiments, the base value determination system 106 provides the contact base limit increase graphical user interface 502a for display based on user selection of a contacts view element 520. Based on user selection of the contacts view element 520, the computing device 500 updates the screen to show a listing of contacts and corresponding base limit increase elements. As further illustrated, based on user selection of the contacts view element 520, the base value determination system 106 also provides options to pay or request payment from contacts (e.g., "pay or request").

The contact base limit increase graphical user interface 502a illustrated in FIG. 5A further includes a base limit increase element 504. Based on user interaction (e.g., selection of) the base limit increase element 504, the computing device 500 updates the screen to display the contact base limit increase graphical user interface 502a. As illustrated, the base limit increase element 504 also includes icon 506 that indicates the number of remaining base limit increases.

As illustrated in FIG. 5A, the contact base limit increase graphical user interface 502a includes a close contacts list 510 and a contacts list 512. The close contacts list 510 includes contacts that the base value determination system 106 determines to be close contacts. The close contacts list includes contact identifiers as well as base limit increase elements. Contact identifiers may comprise a contact name (e.g., "Alejandro") and a user identifier (e.g., "$ing"). Additionally, the base limit increase element included within the close contacts list 510 comprises an additional base limit increase element 514 corresponding to the contact. Generally, the base value determination system 106 provides the additional base limit increase element 514 for display when the contact has sent a base limit increase to the user. As illustrated in FIG. 5A, the base value determination system 106 provides the element 514 for display based on determining that the contact Alejandro sent a base limit increase to the user. Based on an indication of user selection of the element 514, the base value determination system 106 increases the base limit value for the account of the corresponding contact.

In some embodiments, the base value determination system 106 groups contacts based on sending/transmitting base limit value increases (e.g., boosts). For example, the base value determination system 106 generates a first cluster of contacts that have already transmitted a base limit value increase to the user and generates a second cluster of contacts that have not transmitted a base limit value increase to the user. The base value determination system 106 then presents the two clusters for display via the contact base limit increase graphical user interface 502a.

The contact base limit increase graphical user interface 502a illustrated in FIG. 5A further includes the contacts list 512. Generally, the contacts list 512 includes both system contacts and external contacts. In some embodiments, the contacts list 512 includes contacts that are not close contacts. For instance, and as illustrated in FIG. 5A, the close contacts list 510 lists Ana as a contact with a corresponding base limit increase element 516. The contact Ana represents an external contact as the contacts list 512 does not list a user identifier. The base value determination system 106 provides, for display within the contact base limit increase graphical user interface 502a, the base limit increase element 516.

In some embodiments, to protect financial information corresponding to accounts of contacts and the user, the base value determination system 106 presents base limit increase elements for all contacts regardless of whether they have already met the contact threshold number of base limit increases. For example, the base value determination system 106 determines that the contact Bernard has received a number of base limit increases meeting the contact threshold of base limit increases for the threshold period. The base value determination system 106 still provides a base limit increase element corresponding to Bernard. In some embodiments, based on receiving an indication of user selection of the base limit increase element, the base value determination system 106 provides an error notification that indicates to the user that the user cannot send a base limit increase to the selected contact for the present threshold period. In some embodiments, based on receiving an indication of user selection of the base limit increase element, the base value determination system 106 does not provide a notification to the user, but also does not provide a base limit increase to an account corresponding to the selected contact.

Based on increasing the base limit value for an account associated with a selected contact, the base value determination system 106 provides a notification to the user. FIGS. 5B-5C illustrate example user notifications in accordance with one or more embodiments. In particular, FIG. 5B illustrates a user notification 518 indicating that the base value determination system 106 increased the base limit value for an account associated with a system contact. For instance, the user notification 518 indicates that the base value determination system 106 sent a base limit increase to Alejandro, a system contact. The user notification 518 indicates that the base value determination system 106 sent a digital notification to the contact via the inter-network facilitation system 104.

In some embodiments, the base value determination system 106 notifies the user that the base value determination system 106 sent a digital notification to the contact using third-party messaging. FIG. 5C illustrates a user notification 522 indicating that the base value determination system 106 sent the contact a digital notification via text message. In some embodiments, the base value determination system 106 provides options for the user to select a means by which digital notifications should be sent. For instance, the base value determination system 106 provides selectable user interface elements for sending the digital notification via text message, email, the inter-network facilitation system 104 or another messaging method. Furthermore, in some examples, the base value determination system 106 automatically sends digital notifications to contacts via text message based on determining that a contact is an external contact.

Figure 6:
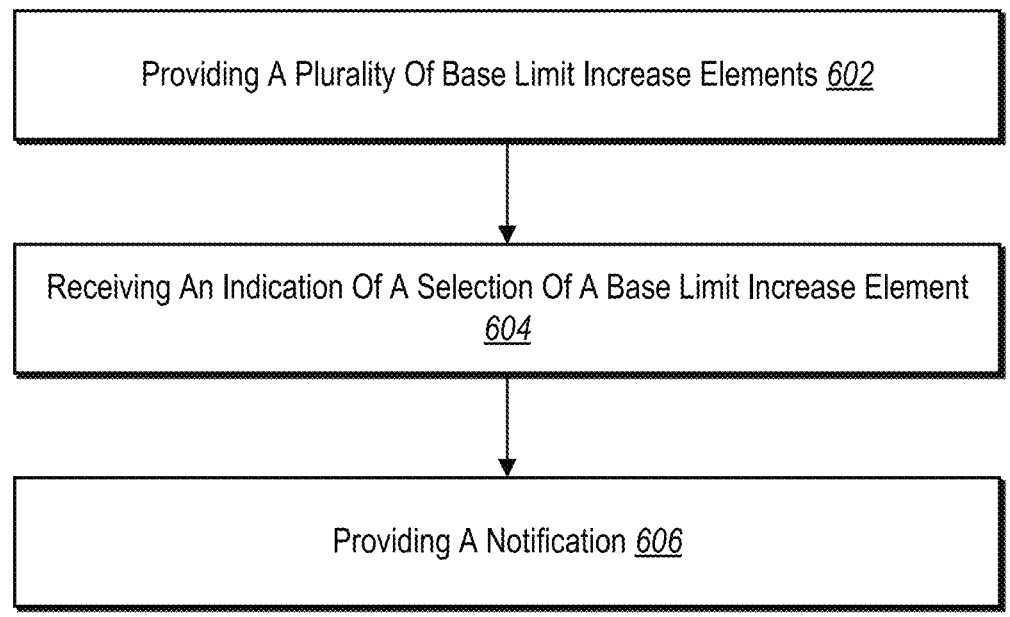
FIG. 6 illustrates a flowchart of a series of acts for providing an increased base limit value to an account associated with a contact in accordance with one or more implementations.

FIGS. 1-5C, the corresponding text, and the examples provide a number of different methods, systems, devices, and non-transitory computer-readable media of the base value determination system 106. In addition to the foregoing, one or more embodiments can also be described in terms of flowcharts comprising acts for accomplishing the particular result, as shown in FIG. 6. The series of acts illustrated in FIG. 6 may be performed with more or fewer acts. Further, the illustrated acts may be performed in different orders. Additionally, the acts described herein may be repeated or performed in parallel with one another or in parallel with different instances of the same or similar acts.

FIG. 6 illustrates a flowchart of a series of acts 600 for providing an increased base limit value in accordance with one or more embodiments. The series of acts 600 includes an act 602 of providing a plurality of base limit increase elements. In particular, the act 602 comprises providing, for display within a graphical user interface of a computing device corresponding to a user, a plurality of base limit increase elements corresponding to a plurality of contacts.

The series of acts 600 illustrated in FIG. 6 further includes an act 604 of receiving an indication of a selection of a base limit increase element. In particular, the act 604 comprises receiving an indication of a selection of a base limit increase element of the plurality of base limit increase elements corresponding to a contact of the plurality of contacts.

The series of acts 600 further includes an act 606 of providing a notification. In particular, the act 606 comprises in response to receiving the indication of the selection, providing, for display within an additional graphical user interface of a computing device corresponding to the contact, a notification indicating the selection of the base limit increase element. In some embodiments, the act 606 comprises providing the increased base limit value for the account associated with the contact based on determining that the contact satisfies one or more base limit value conditions. Additionally, the act of 606 may further comprise determining a contact threshold number of base limit increases corresponding to the contact; and based on determining that a number of base limit increases received by the contact is less than the contact threshold number of base limit increases, providing the increased base limit value for the account associated with the contact. In some embodiments, the act 606 further comprises comprising determining the contact threshold number of base limit increases based on determining that the contact satisfies one or more base limit value conditions.

In some embodiments, the series of acts 600 includes additional acts of determining that the contact is associated with an account; and providing an increased base limit value for the account associated with the contact.

In some embodiments, the series of acts 600 includes additional acts of based on receiving the indication of the selection, providing, for display within the notification, an additional base limit increase element corresponding to the user; and based on receiving an indication of a selection of the additional base limit increase element corresponding to the user, providing an increased base limit value for an additional account associated with the user.

In some embodiments, the series of acts 600 includes additional acts of receiving an additional indication of an additional selection of an additional base limit increase element within an additional graphical user interface; and in response to receiving the additional indication, providing an additional increased base limit value for the account associated with the contact.

Additionally, in some embodiments, the series of acts 600 includes additional acts of determining a threshold number of base limit increases that the user can send; and based on determining that a number of selections of base limit increase elements by the user falls below the threshold number of base limit increases, providing the plurality of base limit increase elements for display within the graphical user interface.

In some embodiments, the series of acts 600 includes an additional act of removing the increased base limit value for the account associated with the contact upon expiration of a threshold period.

The series of acts 600 may further comprise identifying an external contact of the plurality of contacts without an account; receiving an additional indication of an additional selection of an additional base limit increase element of the plurality of base limit increase elements corresponding to the external contact; and in response to receiving the additional indication of the additional selection, transmitting a digital notification regarding the additional selection to a computing device of the external contact.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
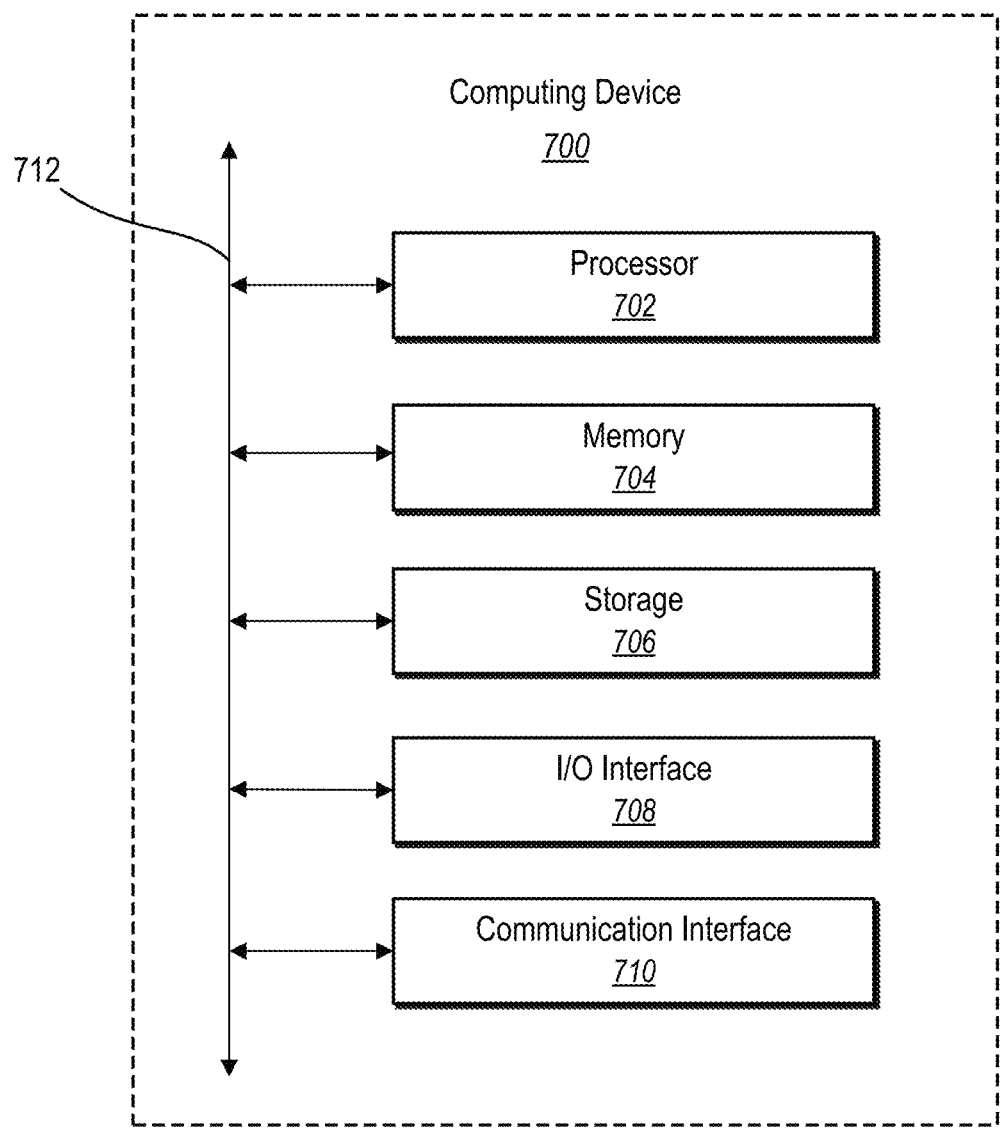
FIG. 7 illustrates a block diagram of an exemplary computing device in accordance with one or more implementations.

FIG. 7 illustrates, in block diagram form, an exemplary computing device 700 that may be configured to perform one or more of the processes described above. One will appreciate that the base value determination system 106 (or the inter-network facilitation system 104) can comprise implementations of a computing device, including, but not limited to, the devices or systems illustrated in the previous figures. As shown by FIG. 7, the computing device can comprise a processor 702, memory 704, a storage device 706, an I/O interface 708, and a communication interface 710. In certain embodiments, the computing device 700 can include fewer or more components than those shown in FIG. 7. Components of computing device 700 shown in FIG. 7 will now be described in additional detail.

In particular embodiments, processor(s) 702 includes hardware for executing instructions, such as those making up a computer program. As an example, and not by way of limitation, to execute instructions, processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, storage device 706 can comprise a non-transitory storage medium described above. The storage device 706 may include a hard disk drive ("HDD"), flash memory, a Universal Serial Bus ("USB") drive or a combination of these or other storage devices.

The computing device 700 also includes one or more input or output ("I/O") interface 708, which are provided to allow a user (e.g., requester or provider) to provide input to (such as user strokes), receive output from, and otherwise transfer data to and from the computing device 700. These I/O interface 708 may include a mouse, keypad or a keyboard, a touch screen, camera, optical scanner, network interface, modem, other known I/O devices or a combination of such I/O interface 708. The touch screen may be activated with a stylus or a finger.

The I/O interface 708 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example, and not by way of limitation, communication interface 710 may include a network interface controller ("NIC") or network adapter for communicating with an Ethernet or other wire-based network or a wireless NIC ("WNIC") or wireless adapter for communicating with a wireless network, such as a WI-FI. The computing device 700 can further include a bus 712. The bus 712 can comprise hardware, software, or both that couples components of computing device 700 to each other.

FIG. 8 illustrates an example network environment 800 of the inter-network facilitation system 104. The network environment 800 includes a computing device 806 (e.g., computing device 110), an inter-network facilitation system 104, and a third-party system 808 connected to each other by a network 804. Although FIG. 8 illustrates a particular arrangement of the computing device 806, the inter-network facilitation system 104, the third-party system 808, and the network 804, this disclosure contemplates any suitable arrangement of computing device 806, the inter-network facilitation system 104, the third-party system 808, and the network 804. As an example, and not by way of limitation, two or more of computing device 806, the inter-network facilitation system 104, and the third-party system 808 communicate directly, bypassing network 804. As another example, two or more of computing device 806, the inter-network facilitation system 104, and the third-party system 808 may be physically or logically co-located with each other in whole or in part.

Moreover, although FIG. 8 illustrates a particular number of client devices 806, inter-network facilitation systems 104, third-party systems 808, and networks 804, this disclosure contemplates any suitable number of client devices 806, inter-network facilitation system 104, third-party systems 808, and networks 804. As an example, and not by way of limitation, network environment 800 may include multiple client devices 806, inter-network facilitation system 104, third-party systems 808, and/or networks 804.

This disclosure contemplates any suitable network 804. As an example, and not by way of limitation, one or more portions of network 804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 804 may include one or more networks 804.

Links may connect computing device 806, inter-network facilitation system 104 (e.g., which hosts the base value determination system 106), and third-party system 808 to network 804 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, the computing device 806 may be an electronic device including hardware, software, or embedded logic components or a combination of two or more such components and capable of carrying out the appropriate functionalities implemented or supported by computing device 806. As an example, and not by way of limitation, a computing device 806 may include any of the computing devices discussed above in relation to FIG. 8. A computing device 806 may enable a network user at the computing device 806 to access network 804. A computing device 806 may enable its user to communicate with other users at other client devices 806.

In particular embodiments, the computing device 806 may include a requester application or a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at the computing device 806 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the computing device 806 one or more Hyper Text Markup Language ("HTML") files responsive to the HTTP request. The computing device 806 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 804) to link the third-party-system 808. For example, the inter-network facilitation system 104 may receive authentication credentials from a user to link a third-party system 808 such as an online bank account, credit account, debit account, or other financial account to a user account within the inter-network facilitation system 104. The inter-network facilitation system 104 can subsequently communicate with the third-party system 808 to detect or identify balances, transactions, withdrawal, transfers, deposits, credits, debits, or other transaction types associated with the third-party system 808. The inter-network facilitation system 104 can further provide the aforementioned or other financial information associated with the third-party system 808 for display via the computing device 806. In some cases, the inter-network facilitation system 104 links more than one third-party system 808, receiving account information for accounts associated with each respective third-party system 808 and performing operations or transactions between the different systems via authorized network connections.

In particular embodiments, the inter-network facilitation system 104 may interface between an online banking system and a credit processing system via the network 804. For example, the inter-network facilitation system 104 can provide access to a bank account of a third-party system 808 and linked to a user account within the inter-network facilitation system 104. Indeed, the inter-network facilitation system 104 can facilitate access to, and transactions to and from, the bank account of the third-party system 808 via a client application of the inter-network facilitation system 104 on the computing device 806. The inter-network facilitation system 104 can also communicate with a credit processing system, an ATM system, and/or other financial systems (e.g., via the network 804) to authorize and process credit charges to a credit account, perform ATM transactions, perform transfers (or other transactions) across accounts of different third-party systems 808, and to present corresponding information via the computing device 806.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 808), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 800 either directly or via network 804. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a computing device 806, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 804.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 806. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a computing device 806. Information may be pushed to a computing device 806 as notifications, or information may be pulled from computing device 806 responsive to a request received from computing device 806. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 806 associated with users.

In addition, the third-party system 808 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 804. A third-party system 808 can communicate with the inter-network facilitation system 104 to provide financial information pertaining to balances, transactions, and other information, whereupon the inter-network facilitation system 104 can provide corresponding information for display via the computing device 806. In particular embodiments, a third-party system 808 communicates with the inter-network facilitation system 104 to update account balances, transaction histories, credit usage, and other internal information of the inter-network facilitation system 104 and/or the third-party system 808 based on user interaction with the inter-network facilitation system 104 (e.g., via the computing device 806). Indeed, the inter-network facilitation system 104 can synchronize information across one or more third-party systems 808 to reflect accurate account information (e.g., balances, transactions, etc.) across one or more networked systems, including instances where a transaction (e.g., a transfer) from one third-party system 808 affects another third-party system 808.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
utilizing a trained activity machine learning model to generate a first activity score from a first set of activity data corresponding to a user having a first user asset account;
utilizing the trained activity machine learning model to generate a second activity score from a second set of activity data corresponding to a contact having a second user asset account;

determining a first base limit value for the first user asset account from the first activity score utilizing a base limit value model, wherein the first base limit value represents an excess utilization buffer for the first user asset account;

determining a second base limit value for the second user asset account from the second activity score utilizing the base limit value model;

determining, based on the first base limit value, a threshold number of base limit increases that can be sent from the user;

providing, for display within a graphical user interface of a computing device corresponding to the user and based on the threshold number of base limit increases, a plurality of base limit increase elements corresponding to a plurality of contacts;

receiving an indication of a selection of a base limit increase element of the plurality of base limit increase elements corresponding to the contact of the plurality of contacts;

in response to receiving the indication of the selection, providing, for display within an additional graphical user interface of a computing device corresponding to the contact;

a notification indicating an increase of the second base limit value for the second user asset account of the contact; and an additional base limit increase element corresponding to the user for providing an increased base limit value for the first user asset account; and in response to receiving an indication of a selection of the additional base limit increase element from the computing device corresponding to the contact, increasing the first base limit value corresponding the first user asset account and modifying the threshold number of base limit increases that can be sent from the user.

2. The computer-implemented method of claim 1, wherein:

the first base limit value comprises a monetary overdraft amount for the first user asset account; and the second base limit value comprises a monetary overdraft amount for the second user asset account.

3. The computer-implemented method of claim 1, further comprising updating the trained activity machine learning model based on application features utilized by the user, wherein the application features comprise the indication of the selection of the additional base limit increase element.

4. The computer-implemented method of claim 1, further comprising increasing the second base limit value for the second user asset account associated with the contact based on determining that the contact satisfies one or more base limit value conditions.

5. The computer-implemented method of claim 4, further comprising removing the increased second base limit value for the second user asset account associated with the contact upon expiration of a threshold period.

6. The computer-implemented method of claim 1, further comprising:

determining a contact threshold number of base limit increases corresponding to the contact; and based on determining that a number of base limit increases received by the contact is less than the contact threshold number of base limit increases, increasing the second base limit value for the second user asset account associated with the contact.

7. The computer-implemented method of claim 6, further comprising:

determining a subset of close contacts for the user; and increasing the threshold number of base limit increases that can be sent from the user to the subset of close contacts.

8. The computer-implemented method of claim 1, further comprising modifying the threshold number of base limit increases that can be sent from the user by:

designating the contact as a close contact based on receiving the indication of the selection of the additional base limit increase element; and increasing the threshold number of base limit increases that can be sent from the user to the contact.

9. The computer-implemented method of claim 1, wherein the first user asset account and the second user asset account comprise debit accounts.

10. A non-transitory computer-readable medium comprising instructions that, when executed by at least one processor, cause a computing device to:

utilize a trained activity machine learning model to generate a first activity score from a first set of activity data corresponding to a user having a first user asset account;

utilizing the trained activity machine learning model to generate a second activity score from a second set of activity data corresponding to a contact having a second user asset account;

determine a first base limit value for the first user asset account from the first activity score utilizing a base limit value model, wherein the first base limit value represents an excess utilization buffer for the first user asset account;

determine a second base limit value for the second user asset account from the second activity score utilizing the base limit value model;

determine, based on the first base limit value, a threshold number of base limit increases that can be sent from the user;

provide, for display within a graphical user interface of a computing device corresponding to the user and based on the threshold number of base limit increases, a plurality of base limit increase elements corresponding to a plurality of contacts;

receive an indication of a selection of a base limit increase element of the plurality of base limit increase elements corresponding to the contact of the plurality of contacts;

in response to receiving the indication of the selection, provide, for display within an additional graphical user interface of a computing device corresponding to the contact;

a notification indicating an increase of the second base limit value for the second user asset account of the contact; and an additional base limit increase element corresponding to the user for providing an increased base limit value for the first user asset account; and in response to receiving an indication of a selection of the additional base limit increase element from the computing device corresponding to the contact, increase the first base limit value corresponding the first user asset account and modifying the threshold number of base limit increases that can be sent from the user.

11. The non-transitory computer-readable medium of claim 10, further comprising instructions that, when executed by the at least one processor, cause the computing device to:
update the trained activity machine learning model based on application features utilized by the user, wherein the application features comprise the indication of the selection of the additional base limit increase element.

12. The non-transitory computer-readable medium of claim 10, further comprising instructions that, when executed by the at least one processor, cause the computing device to:
determine a subset of close contacts for the user; and
increase the threshold number of base limit increases that can be sent from the user to the subset of close contacts.

13. The non-transitory computer-readable medium of claim 10, wherein the first user asset account and the second user asset account comprise debit accounts.

14. The non-transitory computer-readable medium of claim 10, wherein:
the first base limit value comprises a monetary overdraft amount for the first user asset account; and
the second base limit value comprises a monetary overdraft amount for the second user asset account.

15. The non-transitory computer-readable medium of claim 14, further comprising instructions that, when executed by the at least one processor, cause the computing device to remove the increased first base limit value for the first user asset account upon expiration of a threshold period.

16. A system comprising:
at least one processor; and
at least one non-transitory computer-readable storage medium storing instructions that, when executed by the at least one processor, cause the system to:
utilize a trained activity machine learning model to generate a first activity score from a first set of activity data corresponding to a user having a first user asset account;
utilizing the trained activity machine learning model to generate a second activity score from a second set of activity data corresponding to a contact having a second user asset account;
determine a first base limit value for the first user asset account from the first activity score utilizing a base limit value model, wherein the first base limit value represents an excess utilization buffer for the first user asset account;
determine a second base limit value for the second user asset account from the second activity score utilizing the base limit value model;
determine, based on the first base limit value, a threshold number of base limit increases that can be sent from the user;
provide, for display within a graphical user interface of a computing device corresponding to the user and based on the threshold number of base limit increases, a plurality of base limit increase elements corresponding to a plurality of contacts;
receive an indication of a selection of a base limit increase element of the plurality of base limit increase elements corresponding to the contact of the plurality of contacts;
in response to receiving the indication of the selection, provide, for display within an additional graphical user interface of a computing device corresponding to the contact:
a notification indicating an increase of the second base limit value for the second user asset account of the contact; and
an additional base limit increase element corresponding to the user for providing an increased base limit value for the first user asset account; and
in response to receiving an indication of a selection of the additional base limit increase element from the computing device corresponding to the contact, increase the first base limit value corresponding the first user asset account and modifying the threshold number of base limit increases that can be sent from the user.

17. The system of claim 16, wherein:
the first base limit value comprises a monetary overdraft amount for the first user asset account; and
the second base limit value comprises a monetary overdraft amount for the second user asset account.

18. The system of claim 17, further comprising instructions that, when executed by the at least one processor, cause the system to update the trained activity machine learning model based on application features utilized by the user, wherein the application features comprise the indication of the selection of the additional base limit increase element.

19. The system of claim 17, further comprising instructions that, when executed by the at least one processor, cause the system to increase the second base limit value for the second user asset account associated with the contact based on determining that the contact satisfies one or more base limit value conditions.

20. The system of claim 16, further comprising instructions that, when executed by the at least one processor, cause the system to:
determine a contact threshold number of base limit increases corresponding to the contact; and
based on determining that a number of base limit increases received by the contact is less than the contact threshold number of base limit increases, increase the second base limit value for the second user asset account associated with the contact.

* * * * *